United States Patent
Lachwani

(10) Patent No.: US 9,568,983 B1
(45) Date of Patent: *Feb. 14, 2017

(54) POWER CUT OFF MODE FOR CONSERVING POWER IN ELECTRONIC DEVICES

(71) Applicant: Amazon Technologies, Inc., Reno, NV (US)

(72) Inventor: Manish Lachwani, Sunnyvale, CA (US)

(73) Assignee: Amazon Technologies, Inc., Reno, NV (US)

(*) Notice: Subject to any disclaimer, the term of this patent is extended or adjusted under 35 U.S.C. 154(b) by 388 days.

This patent is subject to a terminal disclaimer.

(21) Appl. No.: 14/106,402

(22) Filed: Dec. 13, 2013

Related U.S. Application Data

(63) Continuation of application No. 12/770,031, filed on Apr. 29, 2010, now Pat. No. 8,635,481.

(51) Int. Cl.
*G06F 1/26* (2006.01)
*G06F 1/32* (2006.01)

(52) U.S. Cl.
CPC .................... *G06F 1/3246* (2013.01)

(58) Field of Classification Search
CPC ............................. G06F 1/3206; G06F 21/10
See application file for complete search history.

(56) References Cited

U.S. PATENT DOCUMENTS

| | | | |
|---|---|---|---|
| 7,127,627 B2 | 10/2006 | Khan | |
| 7,302,600 B2 | 11/2007 | Bibikar et al. | |
| 7,523,326 B2 | 4/2009 | Miyazaki et al. | |
| 2006/0068855 A1* | 3/2006 | Miyazaki | H04W 52/0251 455/574 |
| 2007/0288778 A1* | 12/2007 | Zhuang | G06F 1/3203 713/320 |
| 2009/0204834 A1* | 8/2009 | Hendin | G06F 1/22 713/323 |

* cited by examiner

*Primary Examiner* — Albert Wang
(74) *Attorney, Agent, or Firm* — Lee & Hayes, PLLC

(57) ABSTRACT

External jolts, such as those occurring during shipment, may inadvertently activate an electronic device. Such inadvertent activations may result in the electronic device entering an active mode during shipment, draining battery power. This document describes a power cut off mode that prevents inadvertent device activations and minimizes current consumption during shipment or storage of a device. This conserves battery power for operational use by the user.

20 Claims, 6 Drawing Sheets

POWER CUT OFF MODE FOR CONSERVING POWER IN ELECTRONIC DEVICES

CROSS-REFERENCE TO RELATED APPLICATION

This application is a continuation of, and claims priority to, U.S. patent application Ser. No. 12/770,031, filed Apr. 29, 2010, issued as U.S. Pat. No. 8,635,481, and which is incorporated by reference herein in its entirety.

BACKGROUND

Electronic devices, such as electronic book readers ("eBook reader devices"), cellular telephones, portable media players, desktop computers, laptops, tablet computers, netbooks, personal digital assistants, and the like, rely on electrical power to function.

Within these electronic devices, several components utilize significant amounts of power during operation, including the processor(s) and peripheral devices. These peripheral devices include external memory interfaces (EMIs), Universal Serial Bus (USB) controllers, image processing units (IPUs), and so forth. These peripheral devices may reside on the same "chip" or die as the processor and/or may reside on another die.

Inadvertent activation of the electronic device due to environmental factors may occur. For instance, devices may experience transient accelerations from jostling during transport and, in response, may activate or power up certain components of the device. For example, a box containing the electronic device may be dropped during shipment. Such a drop may inadvertently activate the device. During inadvertent activation, the electronic device consumes power, thus depleting power available in a battery powering the electronic device. A user that later attempts to use the electronic device may thus find the battery substantially or completely discharged. The user is therefore required to charge the device, a process which may be inconvenient and take several hours, depending upon the charger, battery capacity, and other parameters.

While mechanical switches with high activation forces may mitigate this problem, these solutions introduce other problems. For instance, design and engineering constraints, such as available volume, ability to control the device, and so forth, may preclude device designers from including such mechanical switches in electronic devices. Furthermore, such an approach may render inoperable a real-time clock of the device, introducing adverse side effects with regard to digital rights management (DRM).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
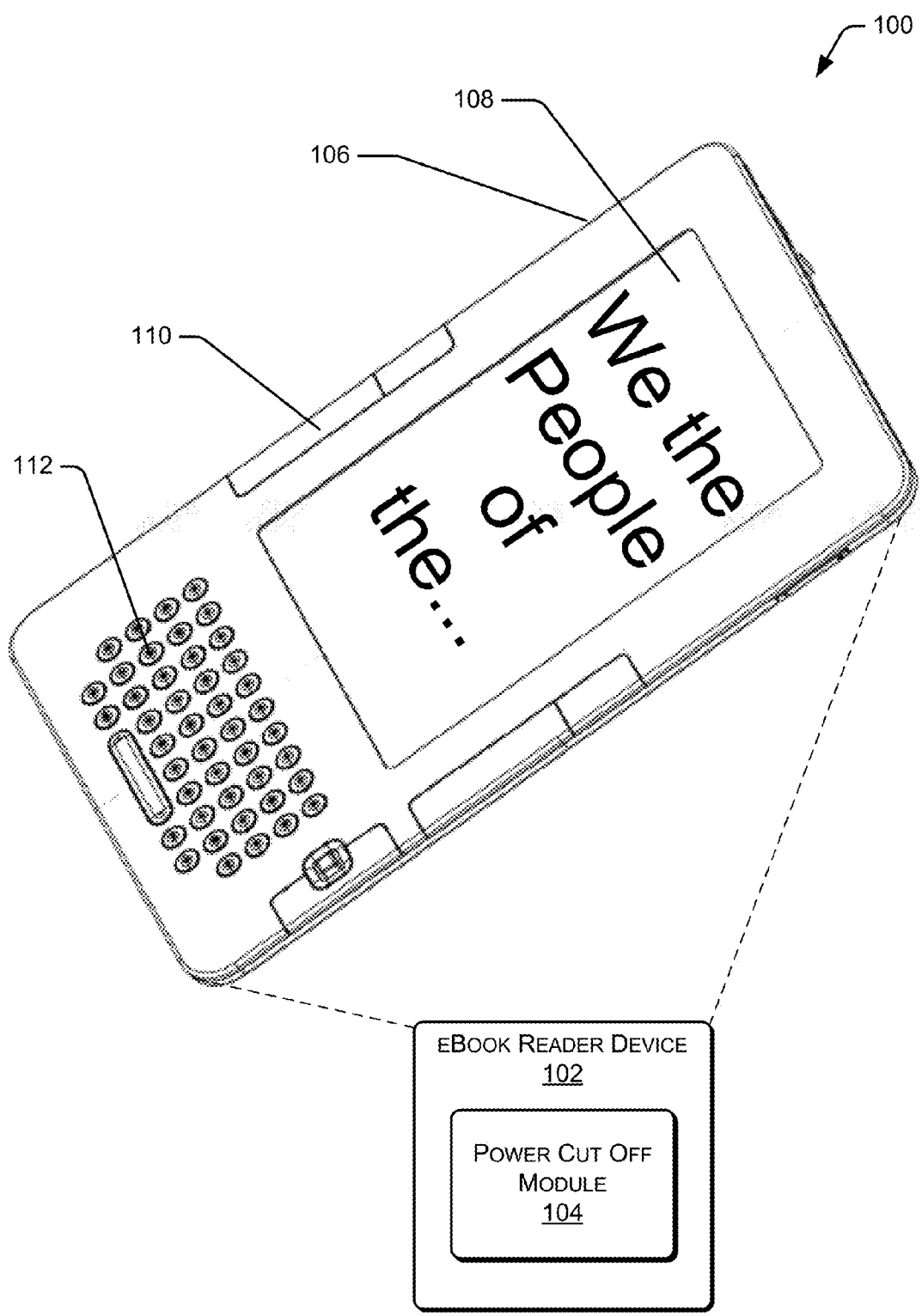
FIG. 1 is an illustrative electronic device (here, an eBook reader device) configured with a power cut off module for placing the eBook reader device into a power cut off mode, thereby reducing inadvertent activations and conserving battery power.

As described above, inadvertent activation of electronic devices depletes power stored in a battery. This creates inconvenience by requiring a user to locate and employ an external power supply, spend time charging the battery, or replace the battery before actually operating the device.

Traditional "off modes" may maintain a power management integrated circuit in an active state, resulting in significant consumption of power. Over time, such as during shipment or storage, this consumption may deplete the battery. Also, traditional off modes may deactivate the real-time clock, complicating digital rights management (DRM) or other functions. Furthermore, traditional off modes may be susceptible to awakening as a result of transient wakeup interrupts, resulting in even more rapid discharge and depletion of the battery.

This disclosure describes techniques for placing a device into a power cut off mode. While in the power cut off mode, a sustained wakeup interrupt will awaken the device, while transient wakeup interrupts will not. Also, while the device is in the power cut off mode described herein the power management integrated circuit maintains a real-time clock and minimal circuitry configured to accept a sustained wakeup interrupt. As a result, a large portion of the power management integrated circuit remains off, which significantly reduces power consumption. Such significant reductions in power consumption minimize battery depletion, thus extending the shelf life of the electronic device. In addition, the operational real-time clock facilitates date/time related functions such as DRM.

The techniques described herein may apply to electronic devices and may provide the ability to access content via a network connection. For example, an eBook reader device may have a wireless network connection to allow convenient access to content stored elsewhere and accessible by the network connection. The content accessed on the device may be subject to DRM restraints. In several implementations of DRM, real-time date and time are at least one of the inputs used to determine accessibility.

For example, DRM may call for an electronic book to be accessible for only a specific two month period, such as when loaned from a library. During the period, the electronic book is accessible, while at the expiration of the period the electronic book is inaccessible. Without the real-time clock, or access to an external authoritative time server, DRM may be inoperable, precluding access to content that the user may be entitled to.

When in the power cut off mode, a sustained wakeup interrupt will awaken the device. The sustained wakeup interrupt includes, for example, the interrupt generated by a user intentionally activating a power switch or from attachment of a charger. The power cut off mode protects the device from inadvertent activations, such as from brief contacts of a power switch due to transient accelerations, because the power management integrated circuit in power cut off mode requires a sustained wakeup interrupt to activate.

In some implementations, the device may enter the power cut off mode after meeting one or more pre-determined conditions. For example, the pre-determined condition may be an elapsed time limit. Thus, when the device is activated after being idle for a length of time greater than the elapsed time limit, rather than resuming a sleep mode, the device may enter the power cut off mode. Thus, the power cut off module prevents a cycle of repeated inadvertent activations, which could deplete the power in the device's battery.

By implementing a power cut off mode described in this disclosure, at least the following several advantages accrue: First, a reduction in the effects of inadvertent activation to avoid depletion of the battery. Second, minimization of the power consumed while a device is off. Third, maintenance of an active real-time clock. The techniques described herein function to, in part, extend the shelf life of battery-powered devices such as eBook reader devices and other handheld electronic devices and enhance a user's overall experience with the device. These techniques may be implemented by an electronic device utilizing a processor capable of entering a low power mode. For example, the i.MX architecture from Freescale™ Semiconductor Incorporated, of Austin, Tex., United States of America, is one suitable family of processors with associated power management integrated circuits (PMICs).

The processor executes an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks®.

For example, an eBook reader device may incorporate a Freescale™ processor having an i.MX architecture with an Atlas PMIC and executing a Linux® kernel. The kernel uses device drivers to communicate with peripheral devices such as the PMIC, external memory interfaces (EMIs), Universal Serial Bus (USB) controllers, image processing units (IPUs), and so forth. These peripheral devices may reside on the same "chip" or die as the processor as in the case of the i.MX architecture and/or may reside on another die.

While this overview is described in terms of an eBook reader device, the concepts described herein may also be applicable to cellular telephones, portable media players, desktop computers, laptops, tablet computers, netbooks, personal digital assistants, or other electronic devices.

Illustrative eBook Reader Device

FIG. 1 is an illustrative electronic device 100 such as an eBook reader device 102. While this figure illustrates an eBook reader device for example purposes, other implementations may employ any other type of electronic device, as discussed above.

As described in more detail below with regards to FIGS. 2-6, a power cut off module 104 is configured to place the eBook reader device 102 into a power cut off mode. While in the power cut off mode, the real-time clock remains operational and the device will awaken upon a sustained wakeup interrupt.

As illustrated, the eBook reader device 102 includes a power switch 106. The power switch 106 and associated circuitry is configured to generate an interrupt upon activation of the switch. In some implementations the power switch 106 may be a momentary contact switch biased with a spring to maintain an open state unless activated, a capacitive switch, and so forth.

The eBook reader device 102 also includes a display 108, as well as a keypad that may include one or more page turning buttons 110 and a keyboard 112 for user input. Furthermore, the keypad may include any other controls configured to receive user input via buttons, touch screen inputs, or the like.

Figure 2:
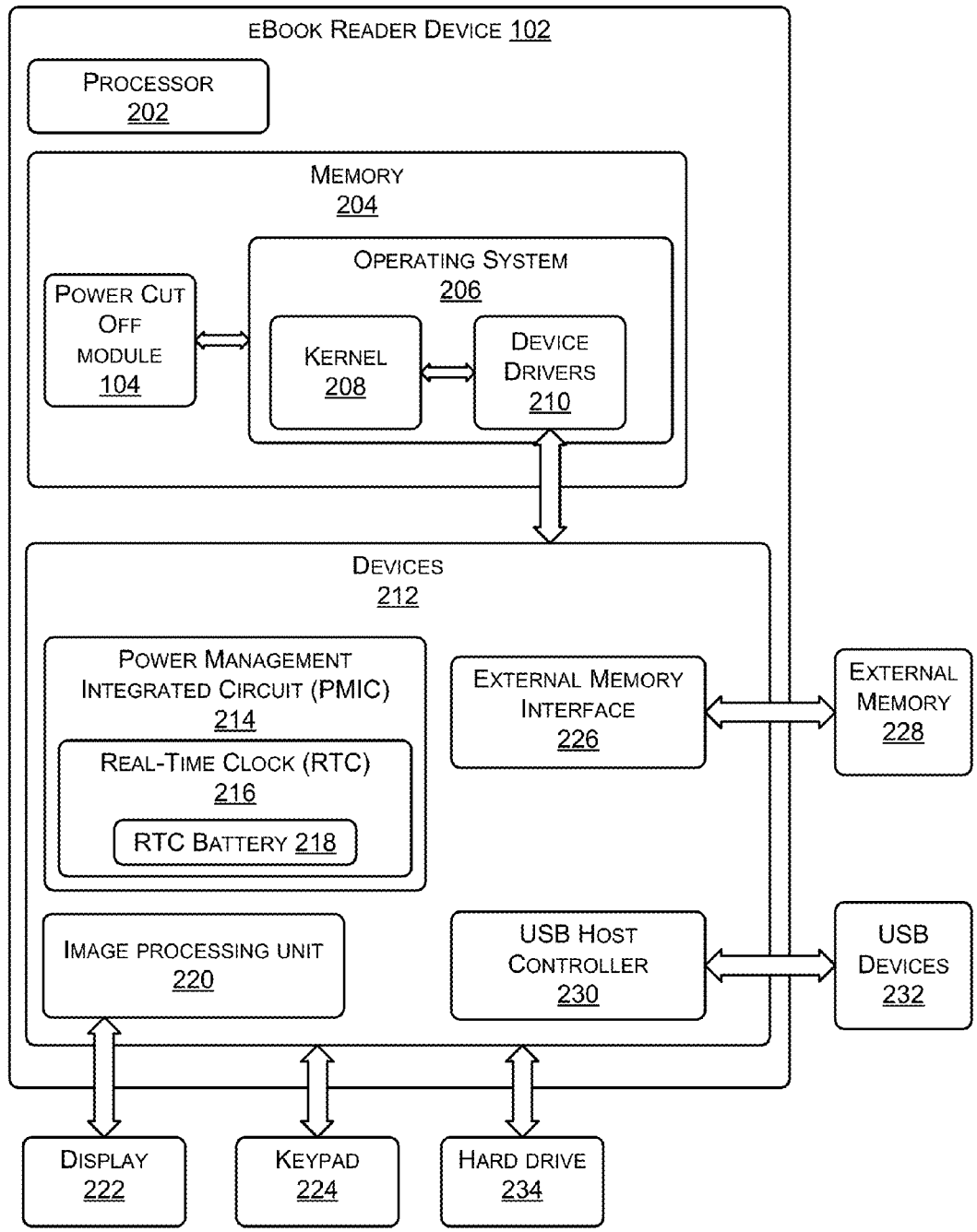
FIG. 2 is an illustrative schematic of the eBook reader device configured to use the power cut off module of FIG. 1.

FIG. 2 is an illustrative schematic 200 of the eBook reader device 102 shown in FIG. 1. A central processor unit ("processor") 202 is shown within eBook reader device 102. Memory 204 within the eBook reader device 102 may store an operating system 206 comprising a kernel 208.

The memory 204 may also store the power cut off module 104, which is coupled to kernel 208. The power cut off module 104 is configured to perform specific acts, including placement of the device into a power cut off mode.

Kernel 208 may operatively couple to one or more device drivers 210 that are stored in memory 204. These device drivers 210 may include a display driver, external memory interface driver, USB host controller driver, and so forth. The device drivers 210 are operatively coupled to devices 212. Several illustrative devices in eBook reader device 102 are described next.

FIG. 2 also illustrates that the device 102 may include a power management integrated circuit (PMIC) 214. The PMIC 214 is configured to, among other functions, distribute and control power to the processor 202, the devices 212, and so forth. For example, the PMIC 214 may be configured to maintain a wait-for-interrupt state. While in the wait-for-interrupt state, upon receiving a wakeup interrupt, the PMIC 214 will power up the processor 202 and other devices 212 to a running awake mode. In some implementations, the PMIC 214 may be specific to a particular processor 202. For example, where the processor 202 is a member of the Freescale™ i.MX family, a corresponding Atlas family PMIC may be used.

The PMIC 214 may incorporate, or couple to, a real-time clock (RTC) 216. The RTC 216 is configured to maintain a clock suitable for tracking calendar date and time. The RTC 216 may be used for several purposes, including acting as a source of information for digital rights management (DRM), providing time comparison for a global position system unit for ephemeris checking, and so forth.

The RTC 216 may facilitate DRM-controlled interactions. For example, a user of a first eBook reader device may loan an eBook to a second user for the month of May. The RTC's 216 in each eBook reader device 102 may be used to enforce that the loaned eBook is inaccessible to the first user and accessible to the second user during the month of May. For example, when the first user attempts to access the loaned eBook during the month of May (as indicated by the RTC 216), the DRM may prohibit access to the eBook that has been temporarily loaned to the second user during this time period.

The RTC 216 may be periodically updated from an external reference, such as a user input, cellular network time, network time protocol, and so forth. Maintaining the RTC 216 enhances the user experience by allowing DRM functionality even when no external reference is available or when the external reference is not deemed to be trustworthy.

In some implementations, the RTC 216 may be coupled to an RTC battery 218. The RTC battery 218 may provide a power source independent of a primary battery within the eBook reader device 102 to maintain operation of the RTC 216. For example, the RTC battery 218 provides power for the RTC 216 to continue functioning when the primary battery is depleted or removed. The RTC battery 218 may comprise a capacitor, coin cell, and so forth.

An image processing unit 220 is shown coupled to a display 222. For example, display 222 may be display 104 on eBook reader device 102 described above with reference to FIG. 1. Image processing unit 220 may be configured to, at the direction of processor 202, take input data and generate an image suitable for presentation on a display 222. For example, the text data of an eBook may be converted into a bitmap of the page suitable for presentation on the display 222.

The display 222 may be capable of presenting an image while the processor 202 is in a low power or off mode. Reflective displays including electrophoretic displays, cholesteric liquid crystal displays, electrofluidic displays, and so forth present an image without applied power. In some implementations, displays that present an image using applied power, such as an organic light emitting diode ("OLED") display, may be configured to enter a self-refresh mode, allowing the display to remain active and present content while the processor 202 is in the low power or off mode. In some implementations, the eBook reader device 102 may comprise two or more displays using different technologies. For example, a first display may comprise an electrophoretic display while a second display comprises an OLED.

The eBook reader device 102 may also include a keypad 224 coupled thereto. For example, this may be the keypad of eBook reader device 102 described above, which incorporates page turn buttons 110 and keyboard 112. As described above, the device may also include a power switch 106. Activation of the power switch 106 generates an interrupt that may be used to trigger a change in power state. For example, when the eBook reader device 102 is in a sleep mode, activation of the power switch 106 may wakeup the device. In another example, the duration of activation of the power switch 106 may be used to specify a particular mode. For example, a two-second activation while the device is in awake mode may result in the device entering a sleep mode, while a four-second activation may place the device in the power cut off mode.

Various sleep or low power modes may be used, including that which is discussed in pending U.S. patent application Ser. No. 12/261,980 filed Oct. 30, 2008 and entitled "Low Power Mode for Processor." For example, on the Freescale architecture, the low power modes many include a doze mode or a state retention mode. While in a low power mode, power consumption is reduced. This reduction in power consumption may be accomplished by shutting down unused hardware, reducing supply voltages, and so forth.

When the eBook reader device 102 is in an active awake mode, activation of the power switch 106 may trigger entry into a sleep mode, or a power cut off mode. Configuration, duration of the activation, and so forth may determine whether sleep or power cut off mode are triggered.

FIG. 2 illustrates that the device may further include an External Memory Interface ("EMI") 226. EMI 226 may be coupled to external memory 228, which may comprise Static Random Access Memory ("SRAM"), Pseudostatic Random Access Memory ("PSRAM"), Synchronous Dynamic Random Access Memory ("SDRAM"), Double Data Rate SDRAM ("DDR"), NAND Flash, and so forth. In some implementations, at least a portion of the power cut off module 104, operating system 206, applications, content, and so forth, may be stored in the external memory 228.

The device may also include a USB controller device 230, which may couple to USB devices 232, such as a wireless wide area network modem. The USB controller device 230 may comply with any of the USB standards including USB 1.0, 1.1, 2.0, 3.0 as set forth by the USB Implementers Forum.

The device 102 may also include a hard drive 234, which may use magnetic or optical memory on spinning disks or solid state storage. The hard drive 234 may be used to store content for consumption by the user, such as electronic books.

The eBook reader device 102 may further include one or more other devices. These other devices may include a Firewire bus, camera, global positioning system receiver, Bluetooth™ wireless device, PC Card device, and so forth.

Operative couplings, such as those between the kernel 208, the power cut off module 104, and the device drivers 210 are shown for emphasis. All devices in FIG. 2 are operatively coupled, with their respective arrows omitted only for clarity of illustration.

Illustrative Processes for Power Cut off Mode

Figure 3:
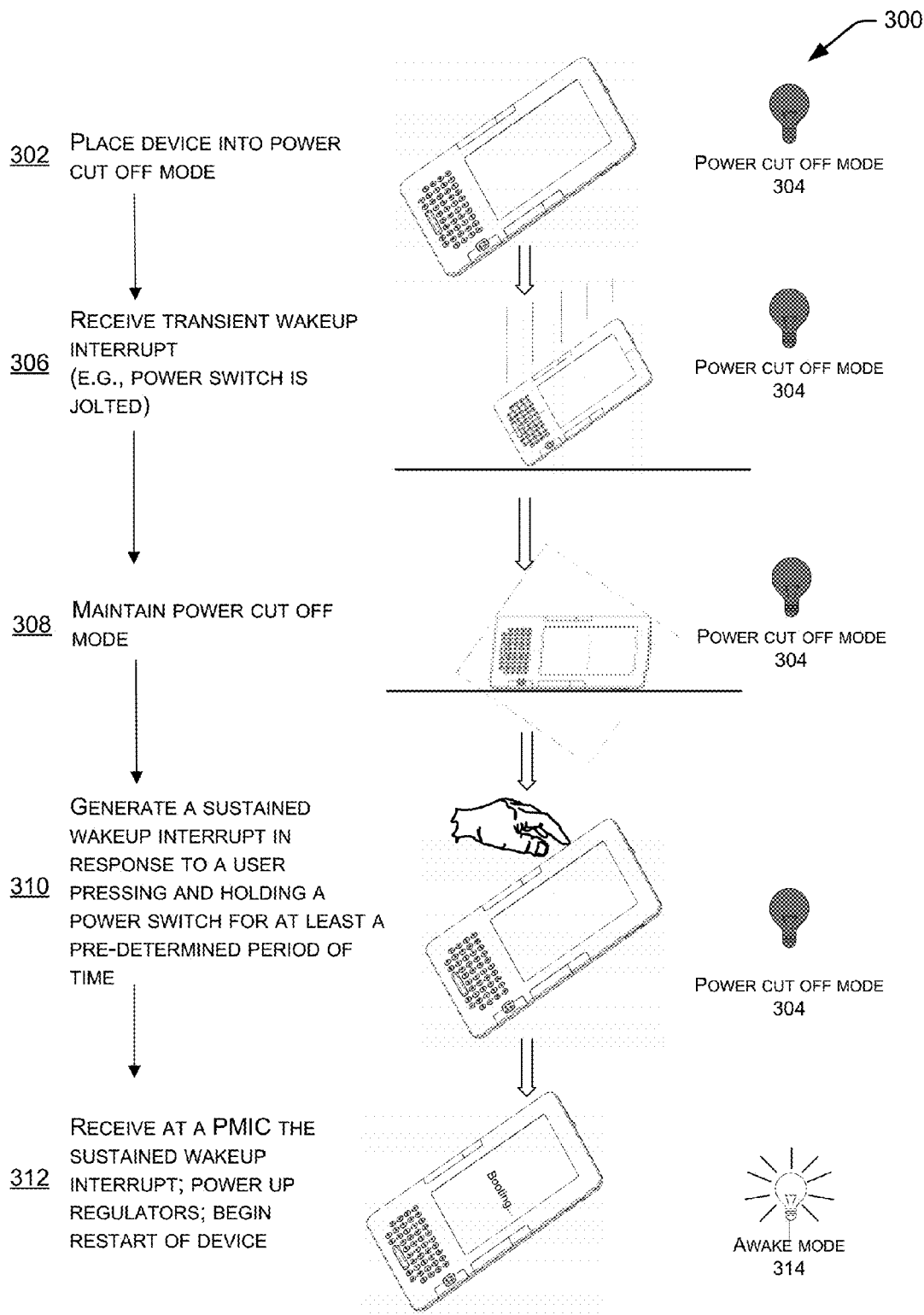
FIG. 3 is an illustrative process of the power cut off module preventing inadvertent activation.

FIG. 3 is an illustrative process 300 that an electronic device 100, such as an eBook reader device 102, may implement using a power cut off module 104. This process may help prevent inadvertent activations, may minimize power consumption of the device while the device is off, may maintain a real-time clock, and so forth.

Operation 302 shows an eBook reader device 102 in a power cut off mode 304. In the power cut off mode 304, power is discontinued to components within the eBook reader device except for portions of the PMIC 214, such as the RTC 216 and wait-for-interrupt circuitry. For example, the processor 202, the memory 204, the display 222, the hard drive 234, the external memory 228, the USB devices 232, the devices 212, and so forth are off while the device remains in the power cut off mode 304.

Operation 306 shows the eBook reader device 102 receiving a transient wakeup interrupt while in power cut off mode 304. This transient wakeup interrupt may include a momentary activation of the power switch. In some implementations, the transient wakeup interrupt comprises a duration of less than 25 milliseconds. In contrast, a sustained wakeup interrupt comprises a duration of at least 25 milliseconds. In some implementations, the duration of the transient wakeup interrupt may comprise a duration of less than 100 ms, while a sustained wakeup interrupt comprises a duration of at least 100 ms.

Transient wakeup interrupts may be generated by factors that are external or internal to the eBook reader device 102. For example, as shown here at operation 306 the eBook reader device 102 may be jostled or bumped, resulting in the power switch 106 being physically bounced and generating a transient wakeup interrupt. This jostling may occur during shipment of the device, during travel by the user, and so forth. Other inadvertent transient activations may occur as a result of the power switch 106 brushing other objects. For example, the user placing the eBook reader device 102 in a backpack filled with other items may result in a transient wakeup interrupt.

Operation 308 shows the device remaining in power cut off mode. Here, the power cut off module 104 has disregarded the transient wakeup interrupt resulting from the jolt, due to the fact that the duration of the transient wakeup interrupt was below a pre-determined threshold. As a result, the battery of the device 102 has not been needlessly depleted by an unnecessary and, here, unintended awakening.

Operation 310 shows the user pressing and holding the power switch for at least a pre-determined period of time. When this period exceeds the pre-determined threshold, a sustained wakeup interrupt is generated.

Operation 312 shows the PMIC 214 receiving the sustained wakeup interrupt. The wait-for-interrupt circuitry, which has been minimally active, is triggered by the sustained wakeup interrupt and begins the power up of the PMIC 214. The PMIC 214 powers up the regulators, which provide power to components of the device 102. Once power is applied to the processor 202, memory 204, device 212, and so forth, the restart of the device begins. The device is now in an awake mode 314, with the components of the device 102 being active and operational.

Figure 4:
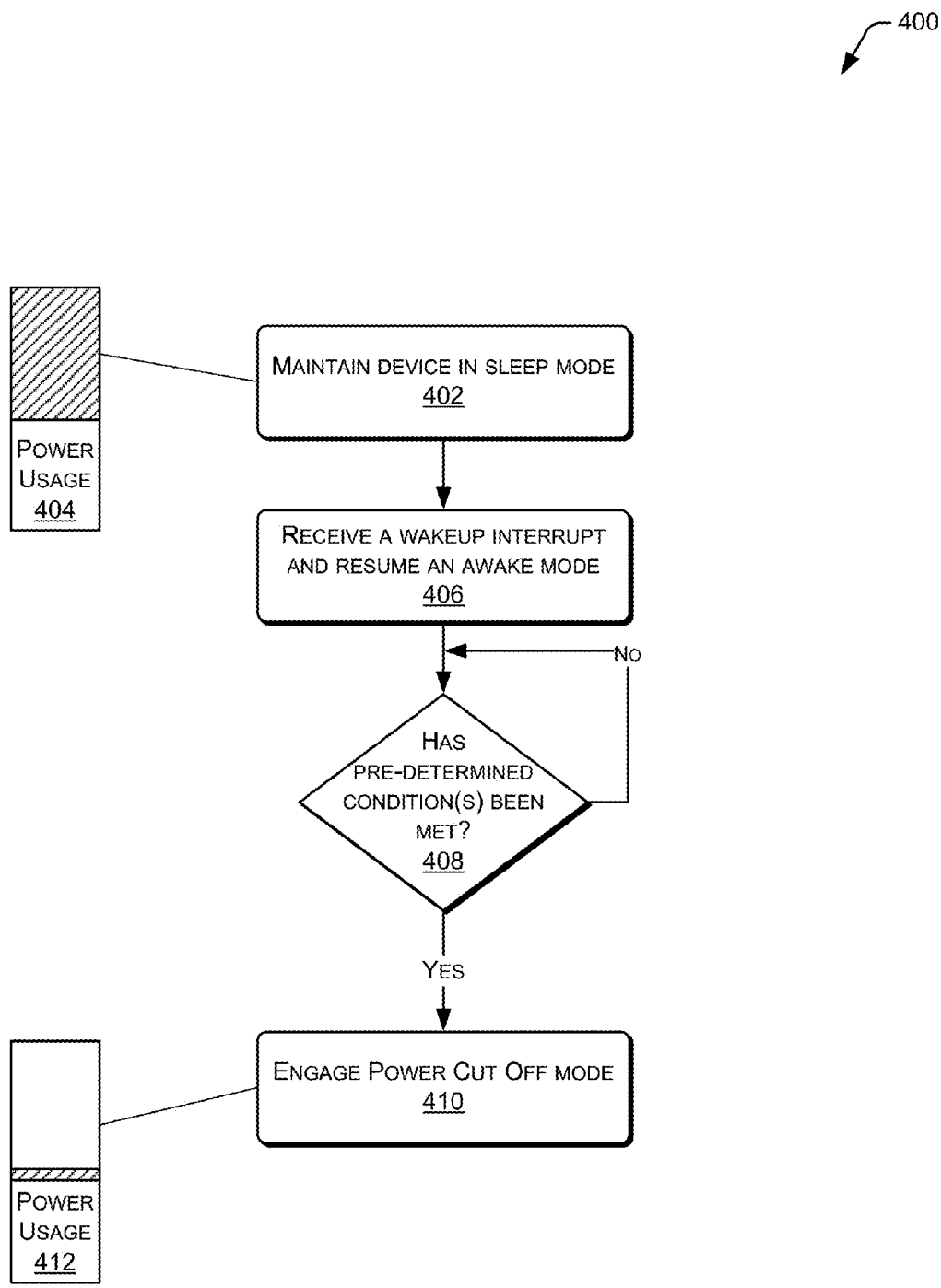
FIG. 4 is an illustrative flow diagram of a process for awakening a device from sleep mode and entering a power cut off mode.
Figure 5:
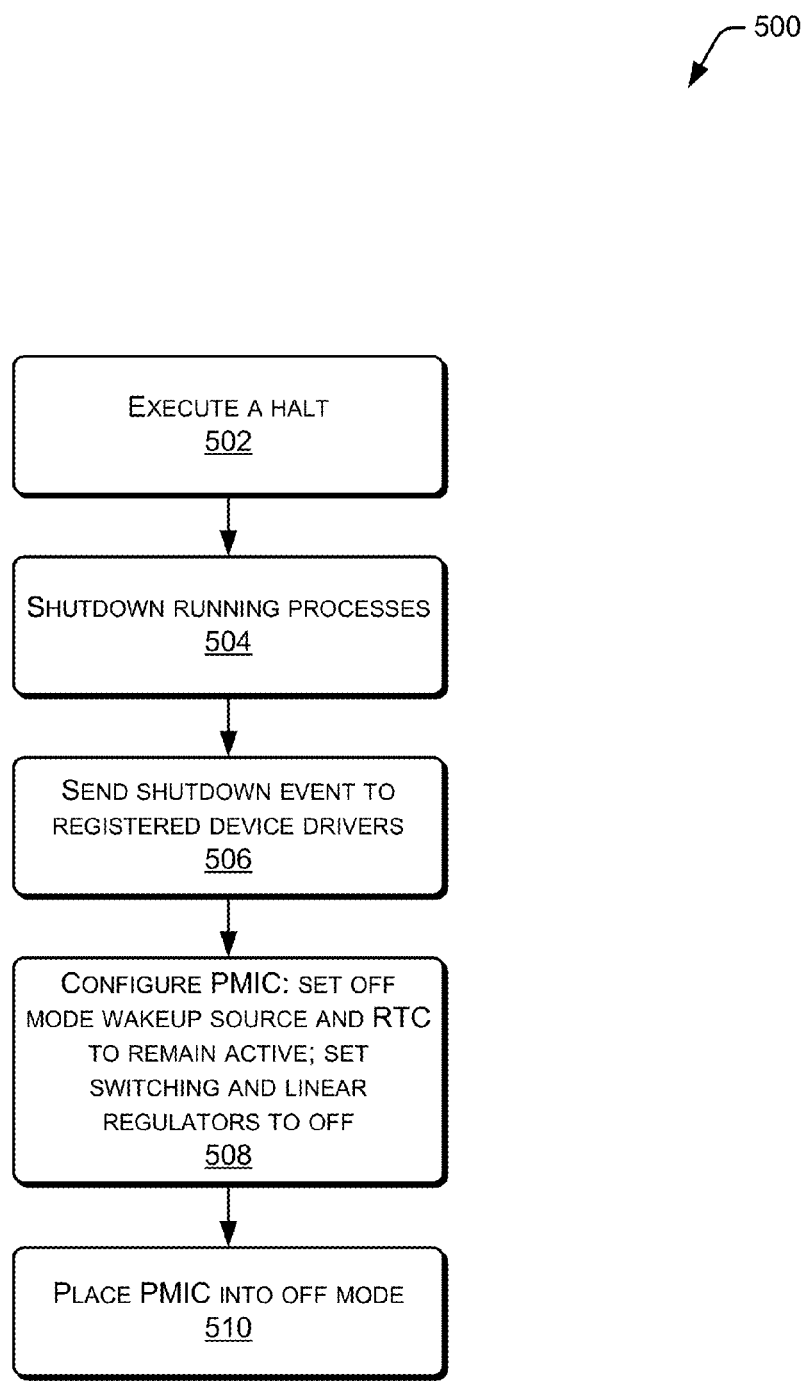
FIG. 5 is an illustrative flow diagram of a process for engaging a power cut off mode.
Figure 6:
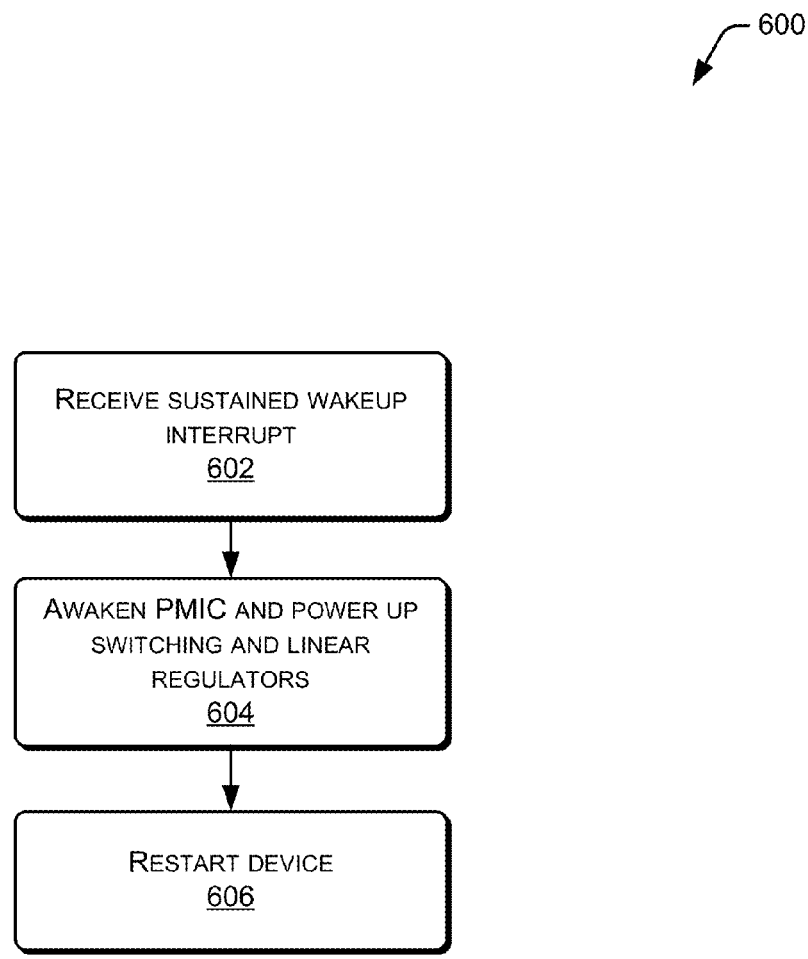
FIG. 6 is an illustrative flow diagram of a process for restarting a device in the power cut off mode.

FIGS. 4-6 illustrate example processes 400, 500, and 600 that may be implemented by the architecture of FIGS. 1-2 or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 4 is an illustrative flow diagram of a process 400 for awakening a device from a sleep mode and entering a power cut off mode. A device may be configured to transition from an active awake mode to a sleep mode after a given period of inactivity or in response to a particular input. For example, the eBook reader device 102 may be configured to enter a low-power sleep mode after ten minutes of no input, after receiving a momentary activation of the power switch 106, and so forth.

Once in the low power sleep mode, the device may be inadvertently activated. For example, as described above the device may be jostled, resulting in a transient wakeup interrupt. It is worthwhile to avoid or minimize a cycle of inadvertent wakeups which could lead to depletion of the battery.

At 402, an eBook reader device 102 is in sleep mode. While sleep mode affords a significant reduction in power consumption over that required during awake mode operation, power usage as indicated by graph 404 continues. For example, in some implementations the sleep mode may consume about 0.400 milliamps (mA). Over the course of several months, such as during shipment, warehousing, transport to the customer, and so forth, even this low power draw may deplete the battery. As a result of this depletion, the user activating the device for the first time may be faced with a lengthy and discouraging charging interval to replenish the depleted battery.

At 406, the device receives a wakeup interrupt and resumes an awake mode. Once awake, at 408 when the device determines one or more pre-determined conditions have been met, the process may proceed to 410.

An administrator, programmer, application, or the user may specify one or more of the pre-determined conditions and associated threshold values upon which the device will engage the power cut off mode.

The pre-determined condition may comprise an elapsed time limit since last action by a user. In this implementation, when the device has been unused for a pre-determined amount of time the device will engage the power cut off mode. The power cut off module calculates an elapsed time by accessing a last active time comprising the date and time of a last action by the user, such as stored in a system log file. The time last active may be the last time of a user input, last access of content stored on the device, and so forth. A current time is accessed from the RTC 216 which has remained operational and thus provides accurate date and time. An elapsed time since last active is calculated by subtracting the current time from the time last active. The elapsed time since last active is compared with an elapsed time limit. When the elapsed time since last active exceeds a pre-determined threshold value, the process may proceed to 410. Otherwise, the pre-determined condition(s) are not met in this example and the device remains awake.

In another implementation, the pre-determined condition may comprise a current battery status. For example, when the battery status drops below a threshold value, the device may engage the power cut off mode.

In yet another implementation, the pre-determined condition may be a flag indicating when the device has completed initial setup by the user. A device in transit which has not yet been used or personalized through the initial setup by the user would thus have the flag set to a value indicating this un-configured state. Thus, when the device has not been setup by the user, the process may proceed to 410.

When, at 408, the one or more pre-determined conditions are met, at 410 the power cut off mode is engaged. As described below in more detail with regards to FIG. 5, the power cut off mode shuts down the operating system and deactivates power to each component of the device 102 except the RTC 216 and wait-for-interrupt circuitry.

While in the power cut off mode, power consumption of the device is significantly reduced as compared to the sleep mode, as shown by graph 412. For example, power consumption may be decreased while in power cut off mode to about 0.034 mA, or about 8.5% of the power used in sleep mode. This decrease in power consumption results in a corresponding increase in the period of time during which the device may be stored without depleting the battery. For example, rather than a few months of storage possible with the device in sleep mode, the device in power cut off mode may be stored for years before depleting the battery.

FIG. 5 is an illustrative flow diagram of a process 500 for engaging a power cut off mode. While the following flow diagram is described using terms, applications, and command present within the Linux operating system, it is understood that this process may also be applied to other operating systems. Furthermore, the following process is described for illustration, and not by way of limitation, as executing on the i.MX architecture using an Atlas PMIC, such as an Atlas Light, chip model number MC13892.

At 502, a userspace application executes a halt or reboot program. As a part of the halt, the init program is run with argument 0, which sends a shutdown signal to all running processes.

At 504, the processes on the device are shutdown at least partly in response to receiving the shutdown signal. Once the userspace applications have shut down, control is transferred to the operating system kernel 208.

At 506, the operating system kernel 208 sends a shutdown event to each registered device driver 210 of the device. The device drivers 210 in turn shutdown or stop associated devices 212. After each of the devices 212 have been stopped, control is transferred to a core kernel code, which handles the shutdown or otherwise places the device into OFF mode.

At 508, the PMIC 214 is configured for power cut off mode. A wakeup source is configured, and the RTC 216 is configured to remain active. Each switching and linear regulator is also configured to be turned off. For example, this includes the switching regulators SW1, SW2—CPU Core, SW4—DDR, and so forth.

Because a restart of the device is not desired in some instances, a watchdog reset signal WDIRESET is configured to 0, which prevents a restart. For example, this may involve setting a RESTARTEN bit to "0" in Atlas register 15.

A universal serial bus input voltage (VUSBIN) may also be turned off when the device is not operating in USB On-The-Go mode. When on, the SWBST is internally switched to supply the VUSB regulator, and SWBST will drive VBUS from the VUSBIN pin. This results in a leakage current of about 0.150 mA, resulting in unnecessary power consumption.

The PMIC 214 configuration also includes configuring the watchdog reset signal (WDIRESET) pin on the power management integrated circuit as a general purpose input/output interface (GPIO). The WDIRESET pin is used in the next step to finalize the power cut off mode.

At 510, the PMIC 214 is placed into the power cut off mode. The placing of the PMIC 214 into the power cut off mode comprises setting the watchdog reset signal pin to a logical low voltage value, which in turn places the PMIC 214 into OFF mode. While in this off mode, the PMIC 214 retains the operation of the RTC 216 and the wait-for-interrupt circuitry. Because the RESTARTEN bit has been cleared, the Atlas does not restart, which would in turn lead to a reset on the processor 202. The device now settles into the power cut off mode.

FIG. 6 is an illustrative flow diagram of a process 600 for restarting a device in the power cut off mode. At 602, a sustained wakeup interrupt is received. Depending upon configuration, the sustained wakeup interrupt is a wakeup interrupt having duration of at least 25 milliseconds. By requiring a sustained wakeup interrupt, inadvertent activations are minimized or eliminated altogether.

At 604, the PMIC 214 is awakened and the switching and linear regulators are powered up, thus bringing the device into the awake mode. At 606, the device begins the restart, with the processor 202 loading and executing the operating system 206 and other applications.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method comprising:
pausing operation of an electronic device;
terminating one or more processes running on the electronic device;
sending a signal to stop operation of one or more components of the electronic;
designating a source for a wakeup signal;
configuring a power management integrated circuit of the electronic device for a power cut off mode, wherein the configuring the power management integrated circuit includes configuring a reset signal pin on the power management integrated circuit as an input/output interface, and wherein, in the power cut off mode, wait-for-interrupt circuitry in the power management integrated circuit is operational; and
setting a real-time clock to remain active with the power management integrated circuit in the power cut off mode.

2. The method as recited in claim 1, further comprising, prior to the activating, configuring the electronic device for the power cut off mode by setting at least one power regulator to transition to an off state to power down a central processor unit of the electronic device when the power cut of mode is activated.

3. The method as recited in claim 2, wherein setting the at least one power regulator comprises setting at least one of a switching regulator or a linear regulator in a power management integrated circuit to transition to the off state, the configuring the electronic device for the power cut off mode further comprising:
clearing a restart register bit in the power management integrated circuit to prevent a restart; and
turning off a universal serial bus input voltage,
wherein the reset signal pin is configured to place the power management integrated circuit into the power cut off mode when set to a low voltage.

4. The method as recited in claim 1, further comprising:
receiving a wakeup signal while the electronic device is in the power cut off mode; and
at least partially in response to the wakeup signal being received for a duration less than a threshold duration, maintaining the power cut off mode.

5. The method as recited in claim 1, further comprising:
receiving a wakeup signal while the electronic device is in the power cut off mode; and
at least partially in response to the wakeup signal being received for a duration that exceeds a threshold duration, causing powering up of at least a portion of the electronic device.

6. The method as recited in claim 5, wherein causing powering up of at least the portion of the electronic device comprises causing activation of at least one power regulator to power up a central processor unit of the electronic device.

7. The method as recited in claim 1, further comprising activating the power cut off mode in response, at least in part, to at least one of:
determining that a threshold amount of time has elapsed since a user action;
determining that a current battery status is below a threshold value; or
determining that the electronic device has not completed an initial setup.

8. An electronic device comprising:
a central processor unit;
a non-transitory computer-readable medium coupled to the central processor unit;
a real-time clock; and
a power cut off module, maintained in the computer-readable medium and configured to be executed by the central processor unit to:
designate a source for a wakeup signal;
set the real-time clock to remain active;
retain operation of a wait-for-interrupt circuitry; and activate a power cut off mode for the electronic device, wherein the power cut off mode comprises powering down the central processor unit and, in the power cut off mode, power consumption of the electronic device is no more than about 0.034 mA.

9. The electronic device as recited in claim 8, wherein the power cut off module is further configured to be executed by the central processor unit to:
   pause operation of the electronic device;
   terminate one or more processes running on the electronic device; and
   send a signal to stop operation of one or more components in the electronic device.

10. The electronic device as recited in claim 8, further comprising a power switch as the source for the wakeup signal.

11. The electronic device as recited in claim 8, wherein the power cut off module is further configured to be executed by the central processor unit to:
   set at least one of a switching regulator or a linear regulator in a power management integrated circuit to transition to an off state in response to activation of the power cut off mode;
   clear a restart register bit in the power management integrated circuit;
   turn off a universal serial bus input voltage; and
   configure a reset signal pin on the power management integrated circuit as a input/output interface, the reset signal pin configured to place the power management integrated circuit into the power cut off mode when set to a low voltage.

12. The electronic device as recited in claim 8, wherein the power cut off module is further configured to be executed by the central processor unit to activate the power cut off mode at least partly in response to determining that a condition has been met, the power cut off mode configuring the electronic device to await a sustained wakeup signal before powering up the electronic device from the power cut off mode.

13. The electronic device as recited in claim 12, wherein the power cut off module is further configured to be executed by the central processor unit to determine that the condition has been met based at least in part on at least one of:
   determining that a threshold amount of time has elapsed since a user action;
   determining that a current battery status is below a threshold value; or
   determining that the electronic device has not completed an initial setup.

14. The electronic device as recited in claim 12, wherein the sustained wakeup signal comprises a wakeup signal having a duration of at least 25 milliseconds.

15. A method comprising:
   receiving, at an electronic device, a wakeup signal while the electronic device is in a power cut off mode, wherein, in the power cut off mode, a circuit of the electronic device is configured to receive a wakeup signal; a central processor unit, switching regulators, and linear regulators of the electronic device are powered down; and a power management integrated circuit of the electronic device retains the operation of a real time clock and wait-for-interrupt circuitry; and
   based at least in part on a duration of the wakeup signal exceeding a threshold duration, the circuit causing at least a portion of the electronic device to power up from the power cut off mode.

16. The method as recited in claim 15, further comprising, prior to receiving the wakeup signal:
   pausing operation of an electronic device;
   terminating one or more processes running on the electronic device;
   sending a signal to stop operation of one or more components of the electronic device;
   designating a source for a wakeup signal;
   setting a real-time clock to remain active; and
   activating the power cut off mode for the electronic device to power down the central processor unit.

17. The method as recited in claim 15, further comprising, prior to the activating, configuring the electronic device for the power cut off mode by:
   setting at least one power regulator to transition to an off state to power down the central processor unit of the electronic device; and
   configuring the circuit to maintain the power cut off mode until receipt of the wakeup signal exceeding the threshold duration.

18. The method as recited in claim 15, wherein causing at least a portion of the electronic device to power up from the power cut off mode comprises causing activation of at least one power regulator to supply power to the central processor unit to enable booting of an operating system.

19. The method as recited in claim 15, wherein exceeding the threshold duration comprises receiving the wakeup signal for at least 25 milliseconds.

20. The method as recited in claim 15, further comprising:
   prior to receiving the wake up signal, receiving another wake up signal while the electronic device is in the power cut off mode; and
   based at least in part on a duration of the other wakeup signal being less than the threshold duration, the circuit causing the electronic device to maintain the power cut off mode.

* * * * *